United States Patent Office 3,400,704
Patented Sept. 10, 1968

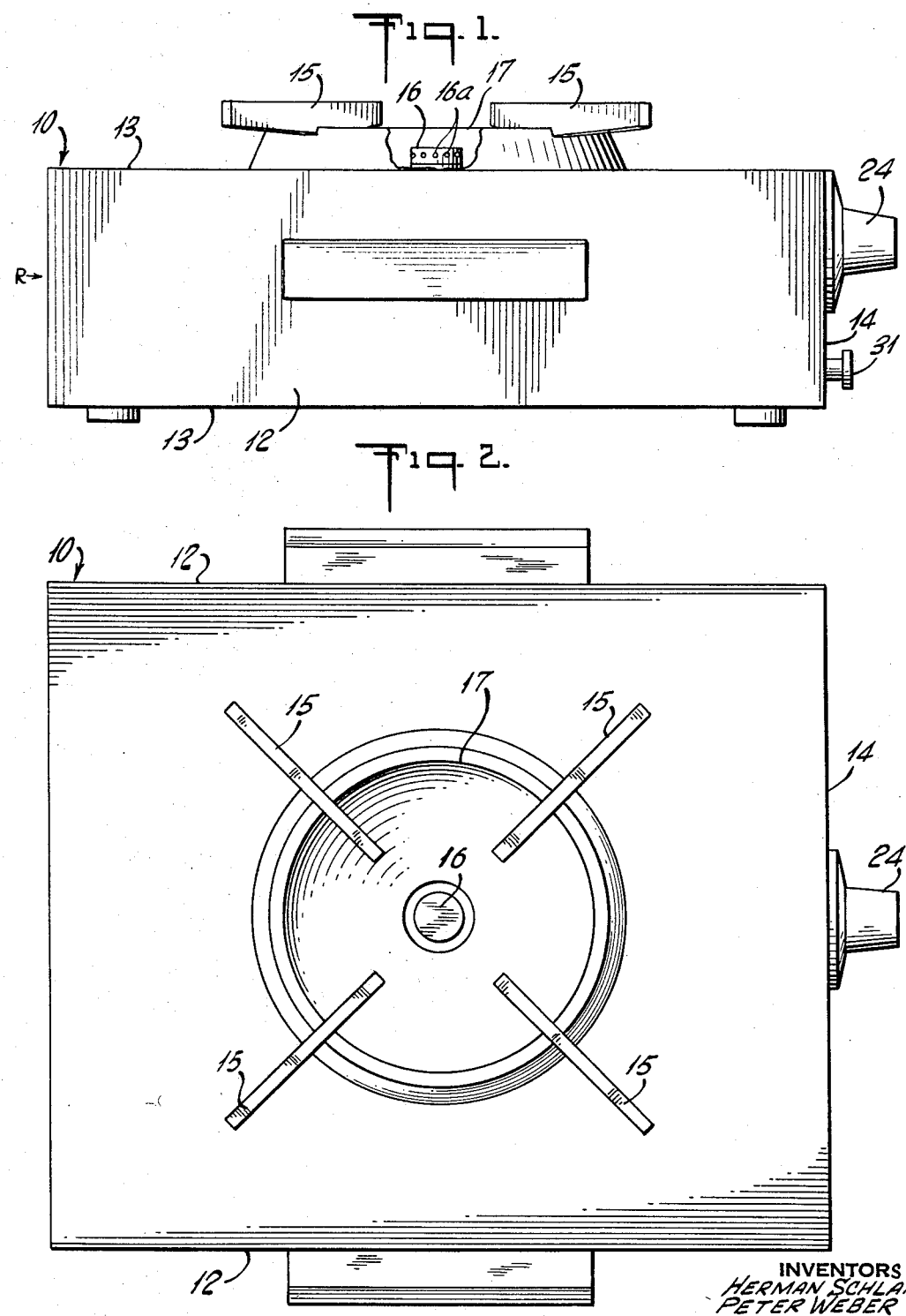

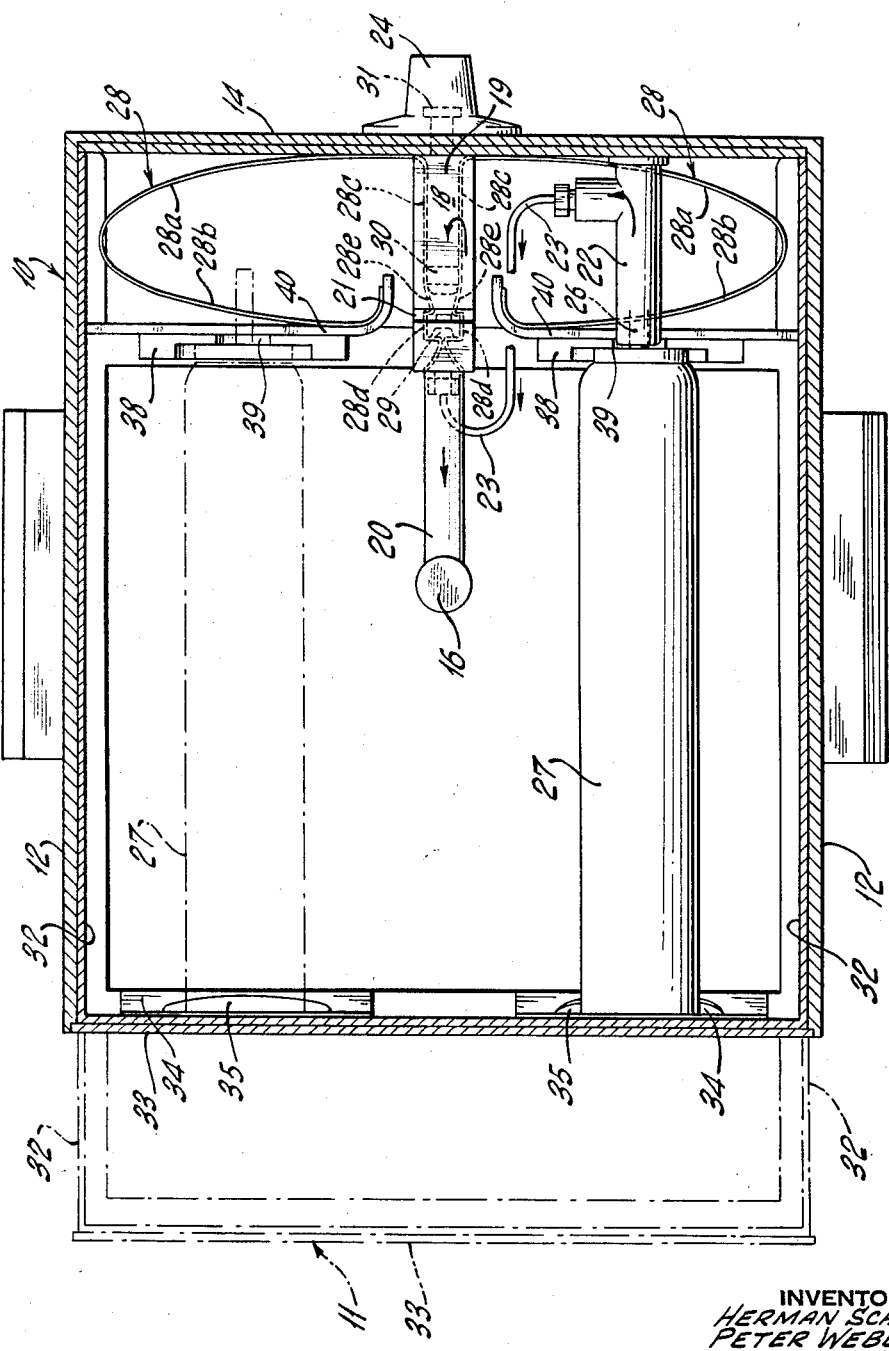

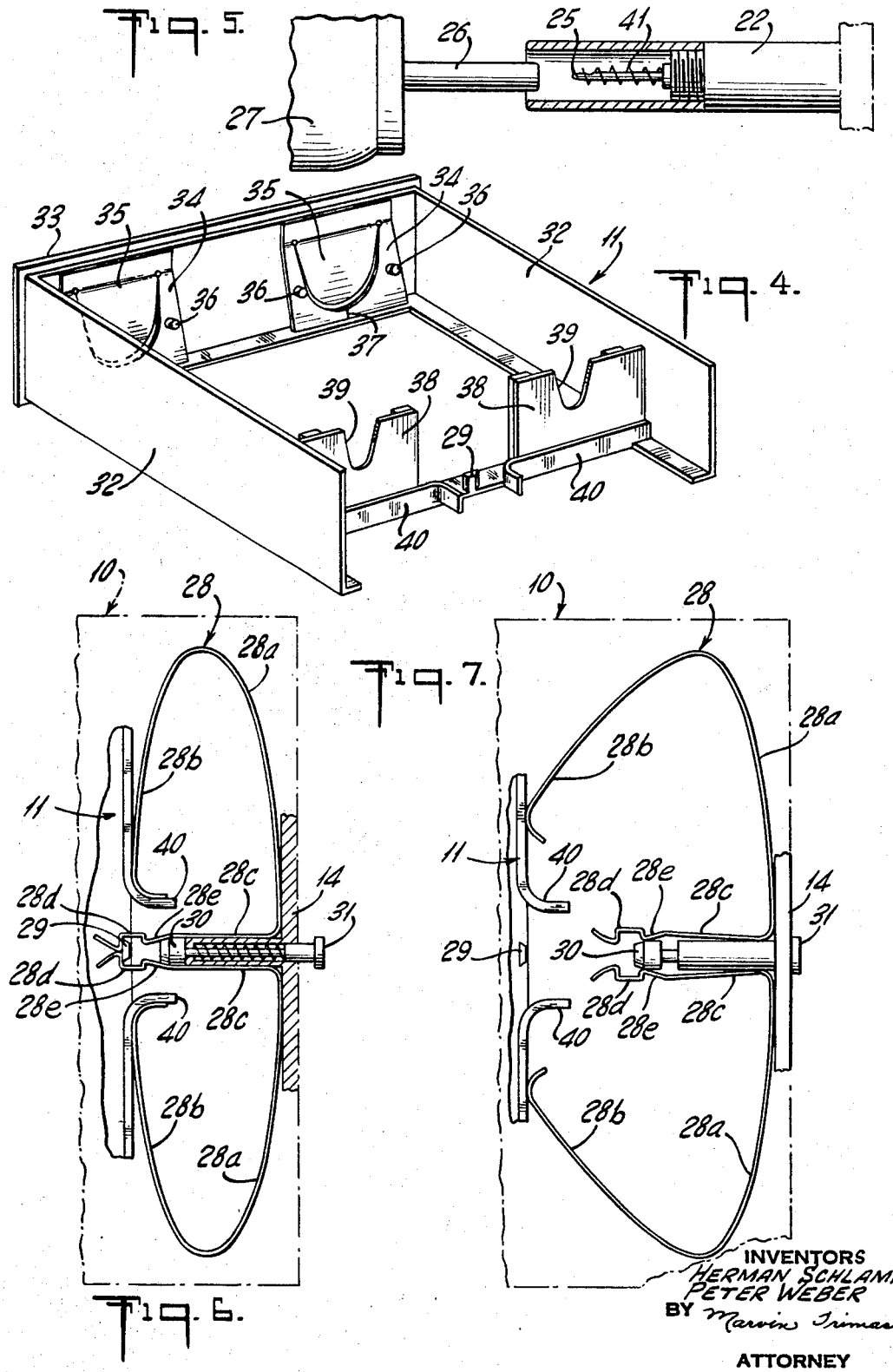

3,400,704
PORTABLE GAS COOKING APPLIANCE
Herman Schlamp and Peter Weber, Cologne (Rhine), Germany, assignors to Ronson Corporation, Woodbridge, N.J., a corporation of New Jersey
Filed Jan. 13, 1967, Ser. No. 609,159
Claims priority, application Germany, Jan. 25, 1966, R 42,486
8 Claims. (Cl. 126—38)

ABSTRACT OF THE DISCLOSURE

A portable gas fired cooking unit having an outer enclosure to which is fixed the gas lines to the burner. A removable drawer which holds replaceable gas refills is placed within the outer enclosure and the gas refill in the drawer automatically becomes aligned with the gas lines in the outer enclosure to supply gas to the burner. A spring in the outer enclosure is tensioned by the drawer and the fixed end of the spring holds the drawer within the outer enclosure. A plunger releases the spring retainer and automatically disengages the gas supply and ejects the drawer holding the gas supply means.

---

This invention relates to a portable lightweight gas cooking device which is suitable for use inside and outside the home.

The prior art has long felt the need for a lightweight, portable cooking unit which the housewife and even children can handle with relative ease. Prior art devices of this nature are generally heavy, complicated to handle and expensive. Much of the difficulty in the prior art devices stems from the use of bulky containers which store the gaseous fuel used in cooking. These containers are heavy and bulky and lend themselves to industrial uses rather than to household. The prior art cooking units also suffer from the disadvantage that they comprise numerous movable mechanical parts which must be operated by the user in order to set up the cooking unit for use. In addition, the fuel containers were not easily and quickly replaceable. Substitution of a refill container was time consuming and difficult, especially on those prior art devices which required operator loosening, adjustment and then tightening of gas fittings within the cooking device. Even those prior art devices which attempted to overcome these latter difficulties by providing for automatic alignment of the refill container upon its insertion into the cooking device, required an overabundance of parts and manipulations to effect replacement of the fuel container.

The present invention seeks to eliminate the aforementioned disadvantages by providing a simple enclosure having few mechanical parts therein.

It is an object of this invention to provide a cooking stove having a drawer therein for the facile insertion and removal of gas refill containers.

It is an additional object of this invention to provide a lightweight, small and compact cooking stove which is easy to handle and store.

It is yet another object of this invention to provide a cooking stove having few movable parts which is inexpensive and simple to manufacture.

It is still another object of this invention to provide a cooking stove having a gas receiving means in its outer enclosure and a gas refill container within a movably mounted drawer and means to insure that the gas refill container will automatically align with the gas receiving means when the drawer is moved to its closed position within the outer enclosure.

It is still another object to provide a simple means to disconnect the gas refill container from the gas circuit without normally handling any locking connector or gas fittings.

It is a further object of this invention to provide a spring-ejected drawer in which the spring functions as a retainer also.

It is again an object of this invention to provide a resilient gas refill container retaining means which will accommodate various size gas refills.

The above and additional objects will be apparent to those skilled in the art from reading the following description and claims and the drawings in which like reference numerals and symbols have been used in the various figures to denote like parts.

An embodiment of a cooking stove which is shown to illustrate and not limit my invention is depicted in the accompanying drawings, wherein:

FIG. 1 shows a side view in elevation of our cooking stove;

FIG. 2 shows a top plan view of our stove;

FIG. 3 shows the interior mechanism in open and closed positions;

FIG. 4 shows a perspective view of the drawer;

FIG. 5 shows the relative position of the gas refill container with respect to the gas inlet valve;

FIG. 6 shows details of the drawer ejector in closed position, and

FIG. 7 shows details of the drawer ejection mechanism in closed position.

Referring to FIG. 3, it will be noted that the cooking stove includes basically an outer enclosure 10 and an inner drawer 11 therein shown in phantom lines.

The outer enclosure 10 comprises side walls 12, top and bottom walls 13 and a front panel wall 14. The rear portion R of the outer enclosure 10 is open for the reception of the drawer 11. The outer and enclosure and inner drawer, 10 and 11 respectively, can be formed of any material such as plastic, wood or metal.

Supports 15 extend above the plane of the top wall 13. The latter supports hold a utensil such as a dish (not shown) above the flame which is emitted from the burner 16. The burner 16 has a plurality of apertures 16a therein through which gas can exit and be ignited and burned. Since the supports 15 are in proximity with the flame they are preferably formed of a material which is unaffected by heat such as Bakelite or metals for example.

Surrounding the burner 16 is a concave, dished-out portion 17 which is preferably formed of a heat resistant reflective material such as aluminum, however, any other suitable material will suffice. The reflective material can be fixed to the enclosure 10 in any well known manner.

Within the enclosure 10 is the pressure reducing and supply circuit generally denoted by the numeral 18. The housing 19 may use any conventional needle valve (not shown) therein in which a needle moves into and out of an orifice by means of adjusting member 24 to supply gas through conduit 20 to the burner 16. A port 21 can be used to mix air with the gas in the pressure reducer 19. A suitable gas flow control mechanism which is suitable for our purposes is disclosed in copending application Ser. No. 351,722 filed Mar. 31, 1964.

The hollow socket member 22 has a conduit 23 leading therefrom into the housing 19. The member 22 has a spring 41 therein for a purpose to be fully described hereinafter. A hollow needle 25 is located within the member 22 and is axially aligned with the nozzle 26 of a gas refill 27. The hollow needle 25 receives gas from the refill 27 by piercing a self closing rubber diaphragm (not shown) in the nozzle 26 of the refill. The details of the refill nozzle which form no part of this invention can be found in U.S. Patent 3,224,626. Thus the gas circuit begins at the refill 27 which contains a gas preferably in the liquefied state such as butane and flows through the hollow needle 25. The needle is connected to the conduit 23 through which the gas passes and thence to the housing 19 where it is mixed with air. If the orifice within the housing is open the gas will flow through the conduit 20 and into the burner 16 where the gas is ignited and burned. The gas path is shown by the arrows as depicted in FIG. 3.

The outer enclosure 10 has contained therein springs 28 having arms 28a which are fixed to the enclosure by means of any suitable attaching means such as screws. The portions of the spring 28b are resiliently biased outwardly towards the open end of the enclosure 10. The springs 28 bear against the drawer 11 and urge the latter outwardly. The arms 28c of the springs 28 are formed to receive a plunger 30 between the respective arms 28c. The ends 28d of the spring 28 are formed to receive the upstanding lug 29 on the drawer 11 and lock the drawer against the outward bias of the springs 28. The plunger 30 has a button 31 thereon enabling the plunger to be pushed inwardly. The spring arms 28c are formed to have portions 28e having a width between them which is narrower than the width of the plunger 30. Thus when the plunger 30 is pushed inwardly the plunger cams the spring portions 28e outwardly. Since the spring ends 28e are thereby cammed outwardly the lug 29 is released and the spring arms 28b bias the drawer 11 outwardly. The spring 41 within the socket 22 bears on the nozzle 26 of the refill 27 and works in conjunction with the springs 28 to eject the drawer 11. Actually, the spring 41 can be dispensed with if the springs 28 are chosen sufficiently strong. The spring 41 merely assists in the separation of the drawer 11 from the outer enclosure 10. The drawer 11 upon release assumes the position shown in phantom lines in FIG. 3.

The drawer 11 includes upstanding side walls 32 thereon and a rear wall 33 as shown in FIG. 4. Spring members 34 are fixed to the wall 33 and are bent outwardly away from the said wall 33. The springs 34 are inherently resilient and when they are urged toward the wall 33 they tend to resist and attempt to return to their position of no stress. Within the spring 34 is a second spring 35 which is also spaced from the wall 33 and has inherent resiliency and operates as spring 34. The springs 34 and 35 are formed from a sheet of spring steel or other inherently resilient material. The inner spring 35 is used to accommodate refill containers having a small diameter. The larger diameter refill containers can be accommodated on the larger spring 34 which will accept refill diameters up to the space between the lugs 36. For this purpose the spring is split at numeral 37 such that a large diameter refill can be squeezed between the lugs 36 and bias the split leaves 34 of the spring away from each other and hold the refill therebetween.

Members 40 having curved ends thereon are fixed to the drawer 11. The members 40 function as guides for the springs 28 and by forcing the spring ends 28b back toward its fixed portion a greater amount of energy is stored in the spring. Thus, if the spring ends 28b extended toward each other the spring would not be stressed in this area. By providing the member 40 with a curved portion the spring ends 28b are cammed rearwardly and placed under stress. A greater force can thus be applied against the drawer 11.

The opposite wall of the drawer 11 includes upstanding members 38 having V-shaped notches 39 therein. The notches 39 receive and support the forward nozzle 26 of the refill 27. The crotch of the notch is axially aligned with the needle 25 such that forward movement of the nozzle enables it to be pierced by the needle 25. The refills 27 are supported at their rear portion by the springs 34, 35 and at their nozzle portions 26 by the walls 38.

The refills 27 can be connected to the burner 16 either individually or a second needle and conduit can connect the other refill to the burner. If the latter is used a switch mechanism can be placed in the housing 18 and when one refill is exhausted, a switching valve can be actuated to place the other refill in the gas circuit.

In operation, the user places a refill 27 in the partially open drawer 11 by placing the end opposite the nozzle 26 against the spring 34 or 35 depending on the diameter of the refill. By pressing against the spring the latter is placed under tension. The nozzle end 26 of the refill is placed within the V-shaped notch 39 of the upstanding member 38 and the tension of the spring 34, 35 maintains the refill 27 in position.

The user then places the drawer 11 with the refills therein in the outer enclosure 10. The V-shape notch 39 on the upstanding member 38 locates the nozzle 26 of the refill 27 so as to be in axial alignment with the hollow needle 25 in the socket 22. The needle 25 pierces the self-sealing rubber diaphragm in the nozzle 26 and gas within the refill 27 flows through the needle 25 and the conduit 23 to the pressure reducer 18. The user then operates the gas control knob 24 and opens the valve in the pressure reducer a desired amount. Gas then flows through conduit 20 to the burner 16 where it escapes through the jets 16a. The gas is ignited and a plate to be warmed is placed on the supports 15.

When the refill 27 is exhausted the user depresses the button 31 and the plunger biases the holding portions 28d of the spring 28 apart whereby they release the lug 29 on the drawer 11. The spring arms 28b of the spring 28 force the drawer 11 outside the confines of the outer enclosure 10 as shown in phantom lines in FIG. 3. The user can then place the spare refill in place as described supra.

An alternative construction contemplates the use of a switch valve which switches the gas circuit from one refill to another. Thus, the left side of FIG. 3 would be a mirror image of the right side and when the gas is depleted in one side, the gas in the other circuit can be switched into the pressure reducing mechanism.

While there has been shown and described a particular embodiment of this invention, it will be obvious to those skilled in the art that various changes and modifications can be made therein without departing from the invention, and therefore, it is intended in the appended claims to cover all such changes and modifications as fall within the true spirit and scope of the invention.

What we claim is:
1. In a cooking appliance comprising,
   (a) an outer enclosure formed by upstanding walls and a top and bottom wall and open at one end thereof,
   (b) a burner mounted on said top wall,
   (c) gas control and receiving means in said outer enclosure operatively connected to said burner which permits the flow of gas from said gas receiving means to said burner,
   (d) an inner drawer movably mounted within said outer enclosure for movement into and out of said outer enclosure,
   (e) support means positioned within said inner drawer adapted to hold therein a refill containing gas therein and having a nozzle at one end thereof which connects with said gas receiving means upon insertion of said inner drawer into said outer enclosure, said support means being positioned within said inner drawer to allow the insertion of said refill into said inner drawer without removing said inner drawer from said outer enclosure.

2. A cooking appliance as defined in claim 1 in which said gas receiving means comprises a socket having a valve therein to receive said nozzle of said refill.

3. A cooking appliance as defined in claim 2 including a valve control housing having a conduit leading from said socket to said housing and a conduit leading from said housing to said burner whereby gas can pass through said socket to said burner.

4. A cooking appliance as defined in claim 1 further comprising,
 (a) spring means operatively mounted between said outer enclosure and said inner drawer, and
 (b) means to removably latch said inner drawer within said outer enclosure,
whereby upon release of said latch means said spring means ejects said inner drawer and disconnects said refill from said gas receiving means.

5. A cooking appliance as defined in claim 1 in which said inner drawer comprises upstanding walls having spring means attached thereto whereby said spring means bias said refill toward said gas receiving means.

6. A cooking appliance as defined in claim 4 in which said latch means comprises,
 (a) a lug operatively mounted within said outer enclosure, said spring means being formed to engage said lug when said inner drawer is placed within said outer enclosure, and
 (b) release means to remove the engagement of said lug and said spring means.

7. A cooking appliance as defined in claim 5 in which said release means comprises a plunger mechanism which biases said spring means out of engagement with said lug.

8. A cooking appliance as defined in claim 1 in which said inner drawer comprises,
 (a) an upstanding front wall,
 (b) upstanding side walls connected at right angles to said front wall, and
 (c) a rigid rearwardly disposed crosspiece extending between and connected at right angles to said side walls, and in which said support means comprises,
 (d) a leaf spring fixed to the rearwardly facing surface of said front wall, extending outwardly and downwardly therefrom, having a U-shaped notch formed therein to support one end of said refill, and
 (e) an upstanding wall connected to said crosspiece having a U-shaped notch formed therein to support the nozzle end of said refill,
both notches and said gas receiving means being aligned with each other so that upon insertion of said refill into said inner drawer said nozzle and said gas receiving means are automatically aligned.

References Cited
UNITED STATES PATENTS

| | | | |
|---|---|---|---|
| 997,965 | 7/1911 | Cobb | 312—215 |
| 3,189,016 | 6/1965 | Corlet | 126—38 |
| 3,292,668 | 12/1966 | Little | 126—38 X |

FREDERICK L. MATTESON, JR., *Primary Examiner.*

E. G. FAVORS, *Assistant Examiner.*